United States Patent
Surnilla et al.

(10) Patent No.: US 9,453,481 B2
(45) Date of Patent: Sep. 27, 2016

(54) SYSTEM AND METHOD FOR OPERATING AN ENGINE

(71) Applicant: Ford Global Technologies, LLC, Dearbon, MI (US)

(72) Inventors: Gopichandra Surnilla, West Bloomfield, MI (US); Eric Warren Curtis, Milan, MI (US); Daniel Joseph Styles, Canton, MI (US); Satheesh Makkapati, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 437 days.

(21) Appl. No.: 13/909,894

(22) Filed: Jun. 4, 2013

(65) Prior Publication Data

US 2014/0352670 A1    Dec. 4, 2014

(51) Int. Cl.
*F02M 25/07* (2006.01)

(52) U.S. Cl.
CPC ............ *F02M 25/07* (2013.01); *F02M 26/05* (2016.02); *F02M 26/06* (2016.02)

(58) Field of Classification Search
CPC ............ F02M 25/07; F02M 25/0715; F02M 25/0726; F02M 25/0752; F02M 2025/0757; F02M 2025/0761
See application file for complete search history.

(56) References Cited

U.S. PATENT DOCUMENTS

| | | | |
|---|---|---|---|
| 7,367,308 B2 | 5/2008 | Kuo et al. | |
| 7,370,616 B2 | 5/2008 | Kuo et al. | |
| 7,370,633 B2 | 5/2008 | Kang et al. | |
| 7,409,285 B2 | 8/2008 | Kang et al. | |
| 7,867,133 B2 | 1/2011 | Petridis et al. | |
| 7,934,486 B1* | 5/2011 | Styles | F01N 3/2066 123/406.23 |
| 2006/0102158 A1* | 5/2006 | Cairns et al. | 123/568.14 |
| 2008/0196406 A1* | 8/2008 | Kuzuyama | 60/604 |
| 2011/0239997 A1* | 10/2011 | Surnilla et al. | 123/568.21 |

* cited by examiner

*Primary Examiner* — Lindsay Low
*Assistant Examiner* — Kevin Lathers
(74) *Attorney, Agent, or Firm* — Julia Voutyras; Alleman Hall McCoy Russell & Tuttle LLP

(57) ABSTRACT

A method for operating an engine is disclosed. In one example, internal EGR is increased during conditions where cooled EGR is at a higher concentration during a decreasing engine load so that homogeneous compression ignition may be initiated at lower engine loads.

18 Claims, 3 Drawing Sheets

SYSTEM AND METHOD FOR OPERATING AN ENGINE

TECHNICAL FIELD

The present application relates to the field of internal combustion engines. In particular, the field of operating an internal combustion engine and transitioning the engine from higher engine load conditions to lower engine load conditions.

BACKGROUND AND SUMMARY

An engine system may include exhaust gas recirculation (EGR) to improve engine operation. For example, EGR may reduce engine emissions (e.g., NOx) and improve engine efficiency via reducing engine pumping work. In some examples, external EGR (e.g., EGR routed between an exhaust system and an engine air intake system) may be cooled to further reduce engine NOx and reduce the possibility of engine knock at higher engine loads. Cooling the EGR further lowers cylinder charge temperatures, thereby reducing formation of NOx and auto-ignition of end gases. However, at lower engine loads, cooled EGR may cause combustion stability to degrade and lead to the possibility of misfire, increased engine noise, and increased engine vibration. Thus, it may be desirable to use cooled EGR at middle and higher engine loads and reducing its use at lower engine loads. However, since cooled EGR is supplied to the engine intake system, it may take many engine cycles to clear the cooled EGR from the engine intake system when the engine transitions from higher load conditions to lower load conditions. Consequently, engine emissions and combustion stability may degrade when the engine changes from an operating condition where a higher concentration of cooled EGR is supplied to engine cylinders to a condition where a lower concentration of cooled EGR is supplied to engine cylinders.

The inventors herein have recognized the challenges of operating an engine including cooled EGR and have developed a method for operating an engine including cooled EGR, comprising: supplying cooled EGR to engine cylinders; and increasing a concentration of internal EGR supplied to the engine cylinders in response to a concentration of cooled EGR supplied to the engine cylinders during a reduction in engine load.

By increasing a concentration of internal EGR supplied to engine cylinders during a reduction in engine load, it may be possible to provide a technical result of initiating homogeneous charge compression ignition (HCCI) in engine cylinders so that the engine's tolerance for EGR may be increased. Consequently, instead of decreasing internal EGR to reduce cylinder charge dilution during a reduction in engine torque, the increased internal EGR may facilitate the engine transitioning to a HCCI mode where the higher concentration of cooled external EGR may be consumed by the engine and participate in stable combustion.

The present description may provide several advantages. For example, the approach may reduce the possibility of engine misfires when operating an engine with cooled EGR. Additionally, the approach may reduce engine NOx emissions at lower engine loads. Further, the approach may improve engine fuel economy.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE DEPICTED EXAMPLES

Figure 1:
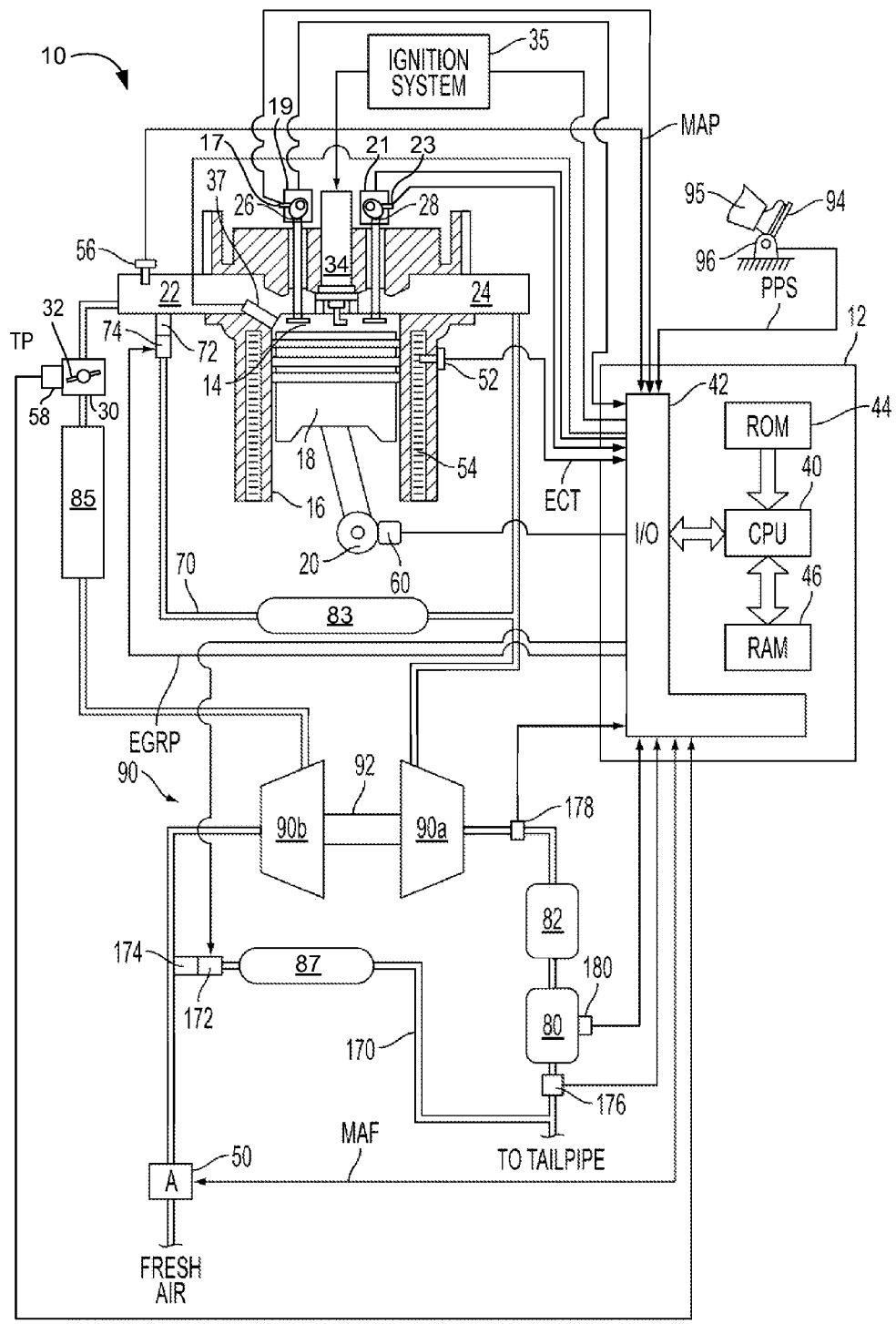
FIG. 1 shows a schematic view of an example of a gasoline direct injection engine.
Figure 2:
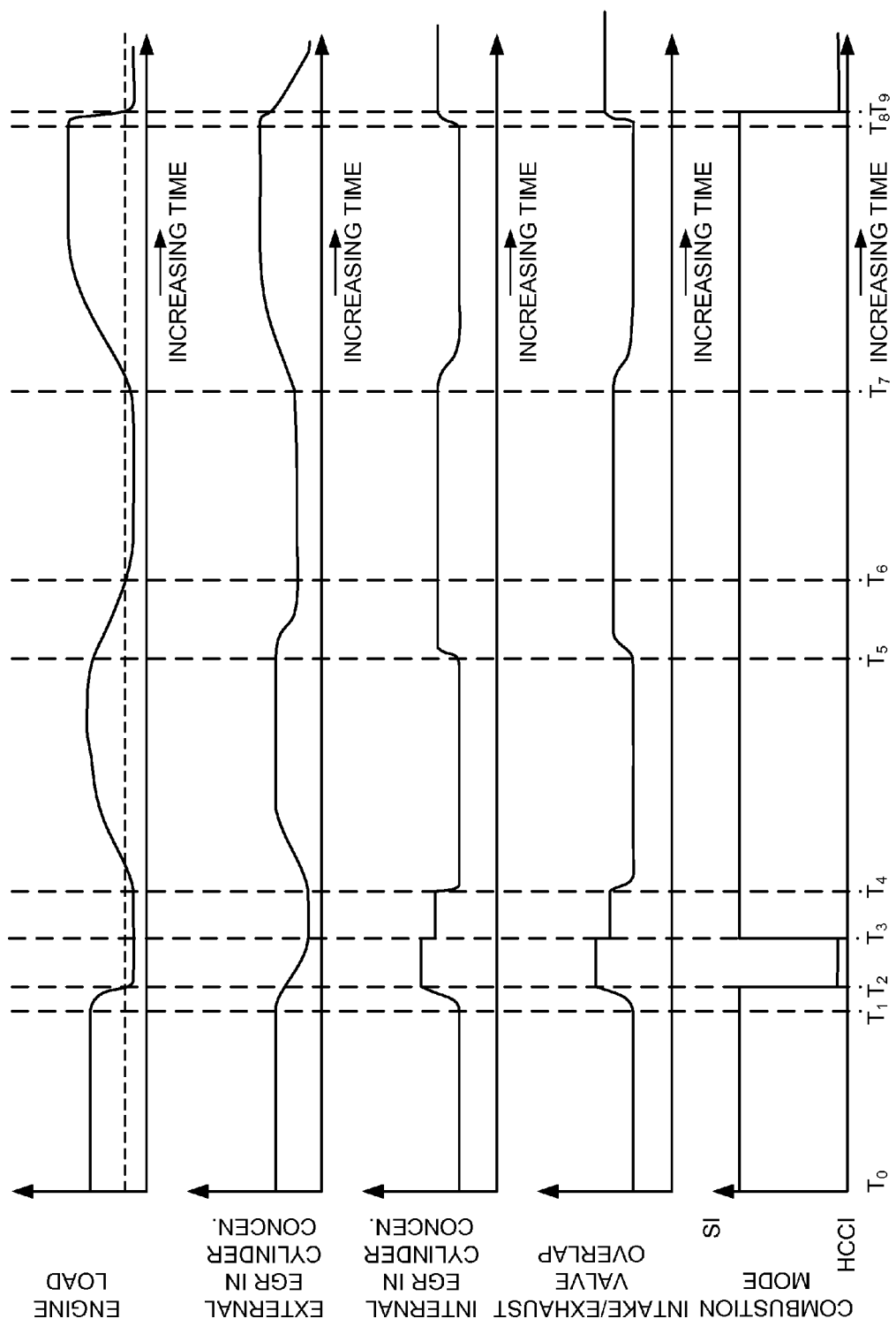
FIG. 2 shows an engine operating sequence for transitioning from a higher engine load condition to a lower engine load condition.
Figure 3:
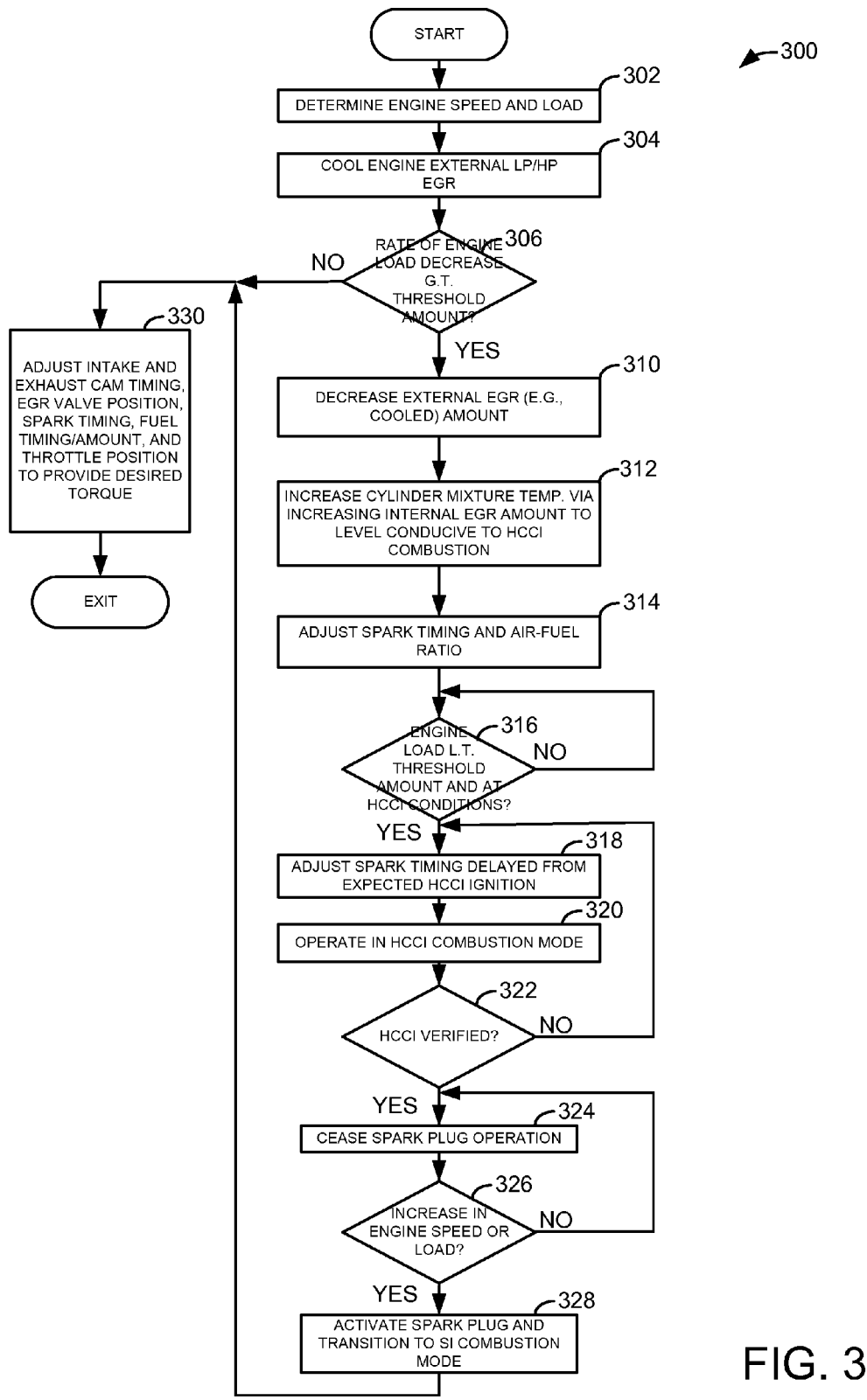
FIG. 3 shows a flow chart for a method of transitioning from a higher engine load to a lower engine load.

The present description is related to transitioning an engine between engine loads. FIG. 1 shows one example system providing power to propel a vehicle. The system includes an engine that may operate at lower or higher engine loads depending on a driver demand torque or desired engine torque. The system includes a controller having non-transitory instructions for operating the engine in spark ignition or homogeneous charge compression ignition combustion modes. FIG. 2 shows example engine operating sequence where engine combustion modes are changed to reduce the concentration of cooled external EGR in engine cylinders so that combustion stability may be improved. FIG. 3 is a flowchart of an example method for transitioning the engine in FIG. 1 between spark ignition and homogeneous charge compression ignition combustion modes.

FIG. 1 shows an example of a gasoline direct injection engine system generally at 10. Specifically, internal combustion engine 10 comprises a plurality of cylinders, one cylinder of which is shown in FIG. 1. Engine 10 is controlled by electronic engine controller 12. Engine 10 includes combustion chamber 14 and cylinder walls 16 with piston 18 positioned therein and connected to crankshaft 20. Combustion chamber 14 communicates with an intake manifold 22 and an exhaust manifold 24 via respective intake valve 26 and exhaust valve 28. Intake valve 26 may open and close at engine positions that vary with respect to crankshaft position via variable intake valve actuator 19. The opening and closing time of intake valve 26 may be determined via sensor 17. Similarly, Exhaust valve 28 may open and close at engine positions that vary with respect to crankshaft position via variable exhaust valve actuator 21. The opening and closing time of exhaust valve 28 may be determined via sensor 23.

Intake manifold 22 is in fluidic communication with throttle body 30. Throttle plate 32 opens and closes to control air flow into intake manifold 22. In one example, an electronically controlled throttle can be used. In one example, the throttle is electronically controlled to periodically, or continuously, maintain a specified vacuum level in intake manifold 22. Note that throttle body 30 and throttle plate 32 may be located at a location upstream of compression device 90 in some applications.

Combustion chamber 14 is also shown having fuel injector 37 coupled thereto for delivering fuel in proportion to the pulse width of signal from controller 12. Fuel is delivered to fuel injector 37 by a conventional fuel system (not shown) including a fuel tank, fuel pump, and fuel rail (not shown). In direct injection engines, as shown in FIG. 1, a high pressure fuel system is used such as a common rail system.

For gasoline engine applications, spark plug 34 provides an ignition source for the contents of combustion chamber 14. Energy for creating a spark is provided by ignition system 35. Controller 12 adjusts the charging of ignition coils that provide voltage to spark plug 34. For diesel applications, spark plug 34 and ignition system 35 may be eliminated.

In the depicted example, controller 12 is a conventional microcomputer, and includes a microprocessor unit 40, input/output ports 42, electronic memory 44, which may be an electronically programmable non-transitory memory in this particular example, random access memory 46, and a conventional data bus.

Controller 12 receives various signals from sensors coupled to engine 10, including but not limited to: measurements of inducted mass airflow (MAF) from mass airflow sensor 50 coupled to the air filter [A on FIG. 1]; engine coolant temperature (ECT) from temperature sensor 52 coupled to cooling jacket 54; a measurement of manifold pressure (MAP) from manifold pressure sensor 56 coupled to intake manifold 22; a measurement of throttle position (TP) from throttle position sensor 58 coupled to throttle plate 32; and a profile ignition pickup signal (PIP) from Hall effect (or variable reluctance) sensor 60 coupled to crankshaft 20 indicating engine speed.

Engine 10 may include an exhaust gas recirculation (EGR) system to help lower $NO_x$ and other emissions. For example, engine 10 may include a high pressure EGR system in which exhaust gas is delivered to intake manifold 22 by a high pressure EGR tube 70 communicating with exhaust manifold 24 at a location upstream of an exhaust turbine 90a of a compression device 90, and communicating with intake manifold 22 at a location downstream of an intake compressor 90b of compression device 90. The depicted high pressure EGR system includes high pressure EGR valve assembly 72 located in high pressure EGR tube 70. Exhaust gas travels from exhaust manifold 24 first through high pressure EGR valve assembly 72, and then to intake manifold 22. A high pressure EGR cooler [shown at 83 in FIG. 1] may be located in high pressure EGR tube 70 to cool recirculated exhaust gases before entering the intake manifold. Cooling is typically done using engine coolant, but an air-to-air heat exchanger may also be used.

Engine 10 may also include a low pressure EGR system. The depicted low pressure EGR system includes a low pressure EGR tube 170 communicating with the post turbine exhaust pipe at a location downstream of exhaust turbine 90a, and communicating with the pre-compressor intake pipe at a location upstream of intake compressor 90b. A low pressure valve assembly 172 is located in low pressure EGR tube 170. Exhaust gas in the low pressure EGR loop travels from turbine 90a through a catalytic device 82 (for example, a three-way catalyst that may have a wash coat comprising platinum, palladium, and rhodium) and a particulate filter 80 or second catalyst before entering low pressure EGR tube 170. Catalytic device 82 processes engine exhaust gases to oxidize exhaust gas constituents, for example. A low pressure EGR cooler 87 may be positioned along low pressure EGR tube 170. Alternatively low pressure EGR can be taken off from a position downstream of the turbine 90a but upstream of the aftertreatment devices 82 and 80, specifically on gasoline engine applications if particulate matter levels are very low.

High pressure EGR valve assembly 72 and low pressure EGR valve assembly 172 each has a valve (not shown) for controlling a variable area restriction in high pressure EGR tube 70 and low pressure EGR tube 170, which thereby controls flow of high and low pressure EGR, respectively.

Vacuum regulators 74 and 174 are coupled to high pressure EGR valve assembly 72, low pressure EGR valve assembly 172, and particulate filter air supply valve assembly, respectively. Vacuum regulators 74 and 174 receive actuation signals from controller 12 for controlling the valve positions of high pressure EGR valve assembly 72, low pressure EGR valve assembly 172. In a preferred example, high pressure EGR valve assembly 72 and low pressure EGR valve assembly 172 are vacuum actuated valves. However, any type of flow control valve or valves may be used such as, for example, an electrical solenoid powered valve, a DC motor power valve or a stepper motor powered valve.

Compression device 90 may be a turbocharger or any other such device. The depicted compression device 90 has a turbine 90a coupled in the exhaust manifold 24 and a compressor 90b coupled in the intake manifold 22 via an intercooler [shown at 85 in FIG. 1], which is typically an air-to-air heat exchanger, but could be water cooled. Turbine 90a is typically coupled to compressor 90b via a drive shaft 92. (This could also be a sequential turbocharger arrangement, single VGT, twin VGTs, or any other arrangement of turbochargers that could be used).

Concentration of oxygen present in the exhaust system may be assessed by oxygen sensors 178 and 176. Further, an additional oxygen sensor (not shown) may be placed between catalyst 82 and particulate filter 80. Oxygen sensor 178 senses engine feed-gas oxygen concentration while oxygen sensor 176 senses exhaust gas oxygen post-catalyst and post-particulate filter. Oxygen sensors may be wide range sensors having a linearized output or they may be sensors that indicate a high gain signal near stoichiometric conditions.

Further, accelerator pedal 94 is shown along with a driver's foot 95. Pedal position sensor (pps) 96 measures angular position of the driver actuated accelerator pedal 94. It will be understood that the depicted engine 10 is shown only for the purpose of example and that the systems and methods described herein may be implemented in or applied to any other suitable engine having any suitable components and/or arrangement of components.

Thus, the system of FIG. 1 provides for an engine system, comprising: an engine including a plurality of cylinders and high and/or low pressure EGR passages, the high and/or low pressure EGR passages including EGR coolers; a variable valve system mechanically coupled to the engine; and a controller including non-transitory executable instructions for increasing a concentration of internal EGR in the plurality of engine cylinders in response to a reduction in engine load greater than a threshold rate of reduction in engine load, and additional executable instructions for operating the engine in a homogeneous charge compression ignition mode after increasing the concentration of internal EGR in the plurality of engine cylinders.

In some examples, the engine system further comprises instructions for entering the homogeneous charge compression ignition mode in response to engine load being less than a threshold engine load after the reduction in engine load is greater than the threshold rate of reduction in engine load.

The engine system further comprises additional instructions for increasing an amount of intake and exhaust valve opening time overlap to increase the concentration of internal EGR. The engine system further comprises additional instructions for increasing a concentration of internal EGR supplied to the engine cylinders in response to a concentration of cooled EGR supplied to the engine cylinders during the reduction in engine load. The engine system further comprises additional instructions for decreasing concentration of internal EGR in response to a decreasing concentration of cooled EGR.

Referring now to FIG. 2, an engine operating sequence for the disclosed method is shown. The sequence of FIG. 2 may be provided by the system shown in FIG. 1 executing instructions of the method of FIG. 3 stored in non-transitory memory. Vertical markers $T_0$-$T_8$ represent particular time of interest during the sequence.

The first plot from the top of FIG. 2 represents engine load versus time. The Y axis represents engine load and engine load increases in the direction of the Y axis arrow. The X axis represents time and time increases from the left side of FIG. 2 to the right side of FIG. 2.

The second plot from the top of FIG. 2 represents external cooled EGR concentration in the cylinder charge before combustion in the cylinder versus time. The Y axis represents external cooled EGR concentration in the cylinder charge before combustion in the cylinder and external cooled EGR concentration in the cylinder charge before combustion in the cylinder increases in the direction of the Y axis arrow. The X axis represents time and time increases from the left side of FIG. 2 to the right side of FIG. 2.

The third plot from the top of FIG. 2 represents internal EGR concentration in the cylinder charge before combustion in the cylinder versus time. The Y axis represents internal EGR concentration in the cylinder charge before combustion in the cylinder and internal EGR concentration in the cylinder charge before combustion in the cylinder increases in the direction of the Y axis arrow. The X axis represents time and time increases from the left side of FIG. 2 to the right side of FIG. 2.

The fourth plot from the top of FIG. 2 represents intake and exhaust valve opening time overlap versus time. The Y axis represents intake and exhaust valve opening time overlap and intake and exhaust valve opening time overlap increases in the direction of the Y axis arrow. The X axis represents time and time increases from the left side of FIG. 2 to the right side of FIG. 2.

The fifth plot from the top of FIG. 2 represents engine combustion mode versus time. The Y axis represents engine combustion mode and engine combustion mode is spark ignition (SI) mode when the combustion mode trace is at a higher level. The engine combustion mode is HCCI when the combustion mode trace is at a lower level. The X axis represents time and time increases from the left side of FIG. 2 to the right side of FIG. 2.

At time $T_0$, engine load is at a middle level and so is the external cooled EGR concentration in the cylinder charge. The external cooled EGR concentration in the cylinder charge may be supplied via a low pressure or a high pressure system as shown in FIG. 1. The internal EGR concentration (e.g., exhaust that is trapped in the cylinder or that flows internally in the engine from the exhaust manifold and/or exhaust system into the cylinder) is also at a middle level and the intake and exhaust valve opening time overlap is at a middle level. Such conditions may be indicative of part load (e.g., 0.4 load) middle speed (e.g., 2500 RPM) engine operation. The engine is shown operating in a spark ignition mode where combustion is initiated in the cylinder via a spark produced via a spark plug.

At time $T_1$, the engine load begins to be reduced slowly at first and then increases with time. The engine load may decrease in response to a driver at least partially releasing an accelerator pedal (e.g., a tip-out condition) or similar device (not shown). The cooled external EGR concentration in the engine cylinders begins to be reduced in response to the reduction in engine load. The cooled external EGR may be reduced via at least partially closing an EGR valve. The internal EGR concentration in the cylinder charge before combustion in the cylinder is also initially increased while the engine load is decreasing. Later the internal EGR concentration in the cylinder charge before combustion is increased further in response to the rate of change in engine load being greater than a threshold amount, the concentration of cooled external EGR in engine cylinders being greater than a threshold amount, and the engine load being less than a threshold load. The internal EGR concentration in the cylinder charge before combustion in the cylinder is adjusted via adjusting the intake and exhaust valve opening time overlap. Initially the intake and exhaust valve opening timing is increased and it is later increased further to increase the internal EGR concentration in the cylinder charge before combustion in the cylinder. The internal EGR concentration is increased by increasing intake and exhaust valve opening time overlap in response to the rate of the reduction in engine load increasing. The engine continues to operate in a SI mode.

At time $T_2$, the engine load is less than a threshold engine load and the engine combustion mode is transitioned from SI to HCCI in response to the engine reaching an engine load that is less than a threshold engine load. Additionally, the intake and exhaust valve opening time overlap it increased to a level that increases temperature of the pre-combustion cylinder charge to a temperature that supports HCCI combustion. The concentration of cooled external EGR continues to decrease as the engine pumps out the contents of the engine intake manifold. Shortly after time $T_2$, the engine load stabilizes, the concentration of cooled external EGR stabilizes, the intake and exhaust valve opening time overlap reaches an increased stabilized level, and the internal EGR level stabilizes. At time $T_3$, the engine can be transitioned back to SI mode and internal EGR is transitioned back to an intermediate level to support low load SI mode. HCCI mode is no longer required to support highly cooled external EGR levels at low loads as the engine transitions to an idle mode. Alternatively, the engine may remain in HCCI mode while in a low load/idle stat for further fuel economy improvement until time $T_4$.

At time $T_4$, the concentration of internal EGR is decreased in response to an increase in engine load. The increase in engine load may be provided via a driver depressing an accelerator pedal or similar device. The cooled external EGR concentration also begins to increase and the intake and exhaust valve opening time overlap is decreased in response to the increase in engine load, thereby decreasing the internal EGR concentration.

At time $T_5$, the engine load is reduced slowly in response to a driver slowly releasing an accelerator pedal. The cooled external EGR concentration in the engine cylinders begins to be reduced in response to the reduction in engine load. The internal EGR concentration in the cylinder charge before combustion in the cylinder is increased while the engine load is decreasing and stabilizes when the engine load stabilizes at a lower value at time $T_6$. The internal EGR concentration is increased by increasing the intake and exhaust valve opening timing overlap in response to the decreasing engine load. During this example transition from a higher engine load to a lower engine load, the engine load changes at a rate that is less than a threshold rate of change. Consequently, the concentration of cooled external EGR can be reduced with decreasing engine load so that the possibility of poor combustion stability is reduced.

At time $T_6$, the engine load is less than a threshold engine load and the engine combustion mode remains in SI mode since the rate of change in engine load is less than a threshold rate of change in engine load. Further, the intake and exhaust valve opening time overlap stabilizes at a desired value as do the internal and cooled external EGR concentrations. Between time $T_6$ and time $T_7$, the engine is operated at idle conditions and the internal and cooled external EGR remain at desired concentrations. The engine also remains in a SI combustion mode.

At time $T_7$, the concentration of internal EGR is decreased in response to an increase in engine load. The increase in engine load may be provided via a driver depressing an accelerator pedal or similar device. The cooled external EGR concentration also begins to increase and the intake and exhaust valve opening time overlap is decreased in response to the increase in engine load, thereby decreasing the internal EGR concentration. The engine remains operating in a SI mode and engine load follows a driver demand torque input to an accelerator pedal.

At time $T_8$, the engine load is reduced quickly in response to a driver quickly releasing an accelerator pedal. The cooled external EGR concentration in the engine cylinders begins to be reduced in response to the reduction in engine load. The internal EGR concentration in the cylinder charge before combustion in the cylinder is increased in response to the rate of change in engine load and the cooled external EGR concentration. The internal EGR concentration is increased by increasing the intake and exhaust valve opening timing overlap in response to the decreasing engine load and cooled external EGR concentration. During this example transition from a higher engine load to a lower engine load, the engine load changes at a rate that is greater than a threshold rate of change. Consequently, the concentration of cooled external EGR may not be reduced as fast as is desired as engine load decreases while the engine is in a SI mode.

At time $T_9$, the engine load is less than a threshold engine load and the engine combustion mode transitions from SI mode to HCCI mode since the rate of change in engine load is greater than a threshold rate of change in engine load and since engine load is less than a threshold engine load. Further, the intake and exhaust valve opening time overlap stabilizes at a desired value that provides a desired internal EGR concentration that supports HCCI combustion. The cooled external EGR concentration is reduced to a desired concentration. The sequence ends shortly thereafter.

Referring now to FIG. 3, a method for operating an engine is shown. The method of FIG. 3 may be stored as executable instructions in non-transitory memory of the system shown in FIG. 1. The method of FIG. 2 may provide the sequence shown in FIG. 2.

At 302, method 300 determines engine speed and load. In one example, engine speed is determined via monitoring and processing output of a crankshaft position sensor. Engine load may be determined via measuring intake manifold pressure or by processing output of an accelerator pedal position sensor. Method 300 proceeds to 304 after engine speed and load are determined.

At 304, method 300 cools external EGR. In one example, EGR is cooled via coolers in low pressure and/or high pressure EGR systems as is shown in FIG. 1. Method 300 proceeds to 306 after external EGR is cooled.

At 306, method 300 judges whether or not a rate of decrease in engine load is greater than a threshold rate of engine load decrease. The reduction in engine load may result from an accelerator pedal tip-out, from a load demand of a controller, or a change in vehicle operating conditions. The threshold rate of engine load decrease may vary with engine operating conditions. For example, if the engine load decrease begins at a time when engine load is a first engine load, the engine load decrease rate threshold may be a first rate of engine load decrease. If the engine load decrease begins at a time when engine load is a second engine load, higher than the first engine load, the engine load decrease rate threshold may be a second rate of engine load decrease, the second rate of engine load decrease less than the first rate of engine load decrease. If method 300 judges that the decrease in engine load is greater than the threshold rate of engine load decrease, the answer is yes and method 300 proceeds to 310. Otherwise, the answer is no and method 300 proceeds to 330.

At 330, method 300 adjusts intake and exhaust valve timings via cam actuators or other devices, low and/or high pressure EGR valve position, spark timing, fuel amount and timing, and throttle position to provide a desired engine torque. The desired engine torque may be determined from driver input to an accelerator pedal or other device. In one example, cam positions, spark timings, fuel amounts, and EGR valve positions are determined from interrogating tables and/or functions that include empirically determined values that are based on and indexed by engine speed and load. Method 300 determines desired spark timing, cam timings (e.g., valve timings), fuel amounts and timings, and EGR valve positions from the tables and/or functions and outputs the empirically determined values from the tables. Method 300 exits after the empirically determined values are output to engine actuators.

At 310, method 300 decreases the amount of cooled external EGR flowing into the engine. The concentration of cooled external EGR flowing into engine cylinders is also decreased, but there may be a delay resulting from the time it takes to evacuate the engine intake manifold of cooled external EGR and air. The cooled external EGR amount is decreased via closing an EGR valve. The cooled external EGR may flow from a low or high pressure EGR passage. Method 300 proceeds to 312 after the amount of cooled external EGR flowing into the engine is decreased.

At 312, method 300 increases a temperature of pre-combustion mixtures of air, fuel, and EGR in engine cylinders via increasing the concentration of internal EGR in engine cylinders. In particular, the concentration of internal EGR in engine cylinders is increased to a concentration that is conducive to HCCI combustion in engine cylinders at engine low load conditions. In one example, the concentration of internal EGR in engine cylinders is increased via increasing an amount of intake and exhaust valve opening time overlap. In other examples, the internal EGR may be increased via adjusting valve lift and/or valve timing.

Method 300 also increases a concentration of internal EGR supplied to the engine cylinders in response to a concentration of cooled EGR supplied to the engine cylinders during a reduction in engine load. In one example, the concentration of internal EGR supplied to the engine is increased to a level that is based on the concentration of cooled external EGR in engine cylinders at the time of the reduction in engine load. For example, if the concentration of cooled EGR in engine cylinders at the time of the reduction in engine load is 20% of gas mass in the cylinder, the concentration of internal EGR in engine cylinders may be increased to 45% of gas mass in the cylinder. Further, the concentration of internal EGR may be increased as the concentration of cooled external EGR during the reduction of engine load increases. And, the concentration of internal EGR may be decreased as the concentration of cooled external EGR during the reduction of engine load decreases. Method 300 proceeds to 314 after the concentration of internal EGR in engine cylinders is increased or adjusted to a level that is conducive to supporting HCCI combustion in engine cylinders.

At 314, method 300 adjusts spark timing and engine air-fuel ratio to support HCCI combustion in engine cylinders. In one example, the engine air-fuel ratio is adjusted lean of stoichiometry and the spark timing is retarded from spark timing when the engine is operated at similar speed and load and not transitioning to HCCI mode. Method 300 proceeds to 316 after spark timing and engine air-fuel ratio are adjusted.

At 316, method 300 judges whether or not engine load is less than a threshold engine load and if the engine is at operating conditions conducive for HCCI combustion. The threshold engine load may change for engine operating conditions. For example, the threshold load may be increased or decreased based on engine temperature. Conditions conducive for HCCI combustion may include but are not limited to engine air-fuel ratio, engine temperature, internal EGR concentration, and engine cylinder mixture temperature before combustion being at threshold values. If method 300 judges that engine load is less than the threshold engine load and engine operating conditions are conducive to HCCI combustion, the answer is yes and method 300 proceeds to 318. Otherwise, the answer is no and method 300 returns to 316.

At 318, engine spark timing is adjusted to a timing that is retarded from expected HCCI ignition timing. The engine continues to provide spark until it may be established that the cylinders are combusting via HCCI. The spark timing is retarded so that ignition may be initiated by HCCI and supported by SI as a way of ensuring combustion in engine cylinders. Method 300 proceeds to 320 after engine spark timing is adjusted.

At 320, method 300 attempts to operate the engine in HCCI mode via adjusting the internal EGR concentration and air-fuel ratio. In particular, the concentration of internal EGR in engine cylinders may be increased at engine idle conditions as compared to the concentration of internal EGR in engine cylinders at idle during SI combustion mode. Method 300 proceeds to 322 after internal EGR concentration and engine air-fuel ratio are adjusted.

At 322, method 300 verifies whether or not HCCI combustion in engine cylinders has been established. In one example, HCCI combustion in engine cylinders is established via comparing in cylinder pressure against stored cylinder pressure profiles for HCCI and SI combustion. In other examples, engine acceleration versus engine position may be a basis for determining whether or not HCCI combustion is established in engine cylinders. If method 300 judges that HCCI combustion is present in engine cylinders, the answer is yes and method 300 proceeds to 324. Otherwise, the answer is no and method 300 returns to 318.

At 324, method 300 ceases to provide spark via the engine spark plug. Spark may be stopped via stopping current flow to engine ignition coils. Method 300 proceeds to 326 after spark at spark plugs is ceased. In other examples, spark may continue to be produced in engine cylinders at a time that is retarded of expected HCCI timing.

At 326, method 300 judges whether or not there is still cooled EGR being purged from the engine intake system or there is an increase in engine load or speed from engine low load/idle conditions. Cooled EGR presence in the intake system may be determined from an EGR transport model. A change in engine load may be determined via monitoring engine intake manifold pressure and temperature. A change in engine speed may be determined via monitoring an engine speed sensor. If method 300 judges that the cooled EGR is purged from the intake system or there is a change in engine load or speed from low load or idle conditions, the answer is yes and method 300 proceeds to 328. Otherwise, the answer is no and method 300 proceeds to 324.

At 328, method 300 activates the spark plugs and begins to supply spark to engine cylinders via the spark plugs. Additionally, method 300 transitions the engine combustion mode from HCCI combustion mode to SI combustion mode via reducing the concentration of internal EGR in engine cylinders via reducing intake and exhaust valve opening time overlap. Further, the engine air-fuel ratio may be richened to a stoichiometric air-fuel ratio. Method 300 proceeds to 330 after the engine transitions from HCCI combustion mode to SI combustion mode.

Thus, the method of FIG. 3 provides for operating an engine including cooled EGR, comprising: supplying cooled EGR to engine cylinders; and increasing a concentration of internal EGR supplied to the engine cylinders in response to a concentration of cooled EGR supplied to the engine cylinders during a reduction in engine load. The method includes where the cooled EGR is supplied via a low pressure EGR system. The method includes where the internal EGR is increased via increasing intake and exhaust valve opening overlap. The method further comprises decreasing the concentration of cooled EGR in response to the reduction in engine load. The method includes where the concentration of internal EGR is increased as the concentration of cooled EGR increases. The method includes where the concentration of internal EGR is decreased as the concentration of cooled EGR decreases. The method further comprises operating the engine in a homogeneous charge compression ignition mode in response to an engine load less than a threshold load after increasing the concentration of internal EGR. The method includes where the engine was operating in a spark ignition mode prior to the reduction in engine load.

In another example, the method includes operating an engine including cooled EGR, comprising: supplying cooled EGR to engine cylinders via a low pressure EGR system; and increasing a concentration of internal EGR supplied to the engine cylinders in response to a concentration of cooled EGR supplied to the engine cylinders during a tip-out. The method includes where the tip-out is a release of an accelerator pedal. The method includes where the concentration of internal EGR is increased via increasing intake and exhaust valve opening time overlap. The method further comprises supplying the cooled EGR to the engine upstream of a compressor positioned along an engine air intake passage. The method further comprises decreasing a concentration of cooled EGR supplied to the engine cylinders via closing an EGR valve and increasing intake and exhaust valve opening time overlap during the tip-out until a rate of decrease in engine load exceeds a threshold rate of decrease in engine load. The method further comprises operating the engine in a homogeneous charge compression ignition mode in response to engine load being less than a threshold engine load. The method further comprises supplying the cooled EGR from downstream of a turbocharger turbine.

It will be appreciated that the configurations and routines disclosed herein are exemplary in nature, and that these specific examples are not to be considered in a limiting sense, because numerous variations are possible. For example, the above approaches can be applied to V-6, I-4, I-6, V-12, opposed 4, and other engine types.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine including cooled EGR, comprising:
    supplying cooled EGR to engine cylinders; and
    increasing a concentration of internal EGR supplied to the engine cylinders in response to a concentration of cooled EGR supplied to the engine cylinders during a reduction in engine load, where the concentration of internal EGR is increased as the concentration of cooled EGR increases, and further comprising decreasing the concentration of cooled EGR supplied to the engine cylinders via closing an EGR valve and increasing intake and exhaust valve opening time overlap during the reduction in engine load until a rate of decrease in engine load exceeds a threshold rate of decrease in engine load.

2. The method of claim 1, where the cooled EGR is supplied via a low pressure EGR system.

3. The method of claim 1, where the internal EGR is increased via increasing intake and exhaust valve opening overlap, and where the engine is in a HCCI mode during the reduction in engine load.

4. The method of claim 1, further comprising decreasing the concentration of cooled EGR in response to the reduction in engine load.

5. The method of claim 1, where the concentration of internal EGR is increased further as the concentration of cooled EGR decreases to transition to a homogeneous charge compression ignition mode.

6. The method of claim 1, further comprising operating the engine in a homogeneous charge compression ignition mode in response to an engine load less than a threshold load after increasing the concentration of internal EGR and while cooled EGR is still present in a combustion chamber.

7. The method of claim 6, where the engine was operating in a spark ignition mode prior to the reduction in engine load.

8. A method for operating an engine including cooled EGR, comprising:
    supplying cooled EGR to engine cylinders via a low pressure EGR system;
    increasing a concentration of internal EGR supplied to the engine cylinders in response to a concentration of cooled EGR supplied to the engine cylinders during a tip-out; and
    decreasing the concentration of cooled EGR supplied to the engine cylinders via closing an EGR valve and increasing intake and exhaust valve opening time overlap during the tip-out until a rate of decrease in engine load exceeds a threshold rate of decrease in engine load.

9. The method of claim 8, where the tip-out is a release of an accelerator pedal.

10. The method of claim 8, where the concentration of internal EGR is increased via increasing intake and exhaust valve opening time overlap.

11. The method of claim 8, further comprising supplying the cooled EGR to the engine upstream of a compressor positioned along an engine air intake passage.

12. The method of claim 8, further comprising operating the engine in a homogeneous charge compression ignition mode in response to engine load being less than a threshold engine load and while cooled EGR is still present in a combustion chamber.

13. The method of claim 12, further comprising supplying the cooled EGR from downstream of a turbocharger turbine.

14. An engine system, comprising:
    an engine including a plurality of cylinders and a low pressure EGR passage, the low pressure EGR passage including an EGR cooler;
    a variable valve system mechanically coupled to the engine; and
    a controller including non-transitory executable instructions for increasing a concentration of internal EGR in the plurality of engine cylinders in response to a rate of reduction in engine load greater than a threshold and a concentration of cooled EGR, and additional executable instructions for operating the engine in a homogeneous charge compression ignition mode after increasing the concentration of internal EGR in the plurality of engine cylinders.

15. The engine system of claim 14, further comprising instructions for entering the homogeneous charge compression ignition mode in response to engine load being less than a threshold engine load after the rate of reduction in engine load is greater than the threshold and while cooled external EGR is still present in a combustion chamber.

16. The engine system of claim 14, further comprising additional instructions for increasing an amount of intake and exhaust valve opening time overlap to increase the concentration of internal EGR, and further comprising additional instructions for decreasing the concentration of cooled EGR supplied to the plurality of engine cylinders via closing an EGR valve and increasing intake and exhaust valve opening time overlap during a tip-out until the rate of reduction in engine load exceeds the threshold.

17. The engine system of claim 14, further comprising additional instructions for increasing the concentration of internal EGR supplied to the plurality of engine cylinders in response to the concentration of cooled EGR supplied to the plurality of engine cylinders during the reduction in engine load.

18. The engine system of claim 14, further comprising additional instructions for decreasing the concentration of internal EGR in response to a decreasing concentration of cooled EGR.

* * * * *